US012017224B2

(12) United States Patent
Isaac et al.

(10) Patent No.: US 12,017,224 B2
(45) **Date of Patent: *Jun. 25, 2024**

(54) MICRODROPLET MANIPULATION DEVICE

(71) Applicant: LIGHTCAST DISCOVERY LTD, Cambridge (GB)

(72) Inventors: Thomas Henry Isaac, Cambridge (GB); Pedro Cunha, Cambridge (GB); Eoin Sheridan, Cambridge (GB); David Love, Cambridge (GB); Rebecca Palmer, Cambridge (GB); Douglas J. Kelly, Cambridge (GB); Gareth Podd, Cambridge (GB)

(73) Assignee: LIGHTCAST DISCOVERY LTD, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/969,001

(22) Filed: Oct. 19, 2022

(65) Prior Publication Data

US 2023/0042172 A1 Feb. 9, 2023

Related U.S. Application Data

(63) Continuation of application No. 17/466,377, filed on Sep. 3, 2021, which is a continuation of application (Continued)

(30) Foreign Application Priority Data

Jun. 21, 2017 (EP) .................................... 17177204

(51) Int. Cl.
*B01L 3/00* (2006.01)

(52) U.S. Cl.
CPC ..... *B01L 3/502792* (2013.01); *B01L 3/50273* (2013.01); *B01L 2200/0673* (2013.01);

(Continued)

(58) Field of Classification Search
CPC ........... B01L 3/502792; B01L 3/50273; B01L 2200/0673; B01L 2300/06;

(Continued)

(56) References Cited

U.S. PATENT DOCUMENTS 4,962,020 A 10/1990 Tabor et al.
6,565,727 B1 5/2003 Shenderov (Continued)

FOREIGN PATENT DOCUMENTS

EP 1 643 231 4/2006
EP 2 828 408 10/2015

(Continued)

OTHER PUBLICATIONS

"Continuous optoelectrowetting for picoliter droplet manipulation", American Institute of Physics, Dec. 2008 by P.Y. Chiou et al. (Year: 2008).*

(Continued)

*Primary Examiner* — Jamil Ahmed
(74) *Attorney, Agent, or Firm* — Wenderoth, Lind & Ponack, L.L.P.

(57) ABSTRACT

A device for manipulating microdroplets using optically-mediated electrowetting comprising: a first composite wall comprising: a first transparent substrate; a first transparent conductor layer on the substrate having a thickness of 70 to 250 nm; a photoactive layer activated by electromagnetic radiation in the wavelength range 400-1000 nm on the conductor layer having a thickness of 300-1000 nm; and a first dielectric layer on the conductor layer having a thickness of 120-160 nm; a second composite wall comprised of: a second substrate; a second conductor layer on the substrate having a thickness of 70 to 250 nm; and an A/C source to provide a voltage across the first and second composite walls connecting the first and second conductor layers; at least one (Continued)

source of electromagnetic radiation having an energy higher than the bandgap of the photoexcitable layer; and means for manipulating the points of impingement of the electromagnetic radiation on the photoactive layer.

8 Claims, 1 Drawing Sheet

Related U.S. Application Data

No. 16/625,068, filed as application No. PCT/EP2018/066573 on Jun. 21, 2018, now Pat. No. 11,135,588.

(52) U.S. Cl.
CPC ..... *B01L 2300/06* (2013.01); *B01L 2300/089* (2013.01); *B01L 2300/12* (2013.01); *B01L 2300/165* (2013.01); *B01L 2300/168* (2013.01); *B01L 2400/0427* (2013.01)

(58) Field of Classification Search
CPC ........... B01L 2300/089; B01L 2300/12; B01L 2300/165; B01L 2300/168; B01L 2400/0427
See application file for complete search history.

(56) References Cited

U.S. PATENT DOCUMENTS

| | | | |
|---|---|---|---|
| 2003/0224528 | A1 | 12/2003 | Chiou et al. |
| 2006/0194331 | A1 | 8/2006 | Pamula et al. |
| 2006/0231398 | A1 | 10/2006 | Sarrut et al. |
| 2007/0241068 | A1 | 10/2007 | Pamula et al. |
| 2009/0155902 | A1 | 6/2009 | Pollack et al. |
| 2010/0096266 | A1 | 4/2010 | Kim et al. |
| 2011/0147215 | A1 | 6/2011 | Fuchs et al. |
| 2012/0044299 | A1 | 2/2012 | Winger |
| 2012/0091003 | A1 | 4/2012 | Chuang et al. |
| 2013/0143312 | A1 | 6/2013 | Wheeler et al. |
| 2013/0233425 | A1 | 9/2013 | Srinivasan et al. |
| 2013/0293246 | A1 | 11/2013 | Pollack et al. |
| 2015/0027889 | A1 | 1/2015 | Pollack et al. |
| 2015/0174578 | A1 | 6/2015 | Srinivasan et al. |
| 2015/0247192 | A1 | 9/2015 | Frayling et al. |
| 2015/0253284 | A1 | 9/2015 | Sudarsan et al. |
| 2015/0298125 | A1 | 10/2015 | Ermakov |
| 2016/0102280 | A1 | 4/2016 | Tovar et al. |
| 2016/0158748 | A1 | 6/2016 | Wu et al. |
| 2016/0160259 | A1 | 6/2016 | Du |
| 2017/0043343 | A1 | 2/2017 | Khandros et al. |
| 2017/0121675 | A1 | 5/2017 | Sugarman |
| 2017/0173580 | A1 | 6/2017 | Lowe, Jr. et al. |
| 2017/0175179 | A1 | 6/2017 | Hiddessen et al. |
| 2018/0133715 | A1 | 5/2018 | Craig et al. |
| 2018/0313819 | A1 | 11/2018 | Pugia et al. |

FOREIGN PATENT DOCUMENTS

| | | |
|---|---|---|
| EP | 3 150 725 | 4/2017 |
| JP | 2005-30987 | 2/2005 |
| JP | 2005-531409 | 10/2005 |
| JP | 2006-300946 | 11/2006 |
| JP | 2009-534653 | 9/2009 |
| JP | 2010-503516 | 2/2010 |
| JP | 2016-153725 | 8/2016 |
| WO | 2004/012848 | 2/2004 |
| WO | 2007/120241 | 10/2007 |
| WO | 2008/051310 | 5/2008 |
| WO | 2010/095577 | 8/2010 |
| WO | 2010/151794 | 12/2010 |
| WO | 2016/116757 | 7/2016 |
| WO | 2018/234445 | 12/2018 |
| WO | 2018/234446 | 12/2018 |

OTHER PUBLICATIONS

"Optofluidic Devices for Droplet and Cell Manipulation", Electrical Engineering and Computer Sciences, University of California at Berkeley, May 15, 2015 by Shao Ning Pei et al. (Year: 2015).*

Chiou et al., "Continuous optoelectrowetting for picoliter droplet manipulation", Applied Physics Letters, 2008, vol. 93, No. 22, pp. 221110-1-221110-3.

Pei, "Optofluidic Devices for Droplet and Cell Manipulation", Electronic Theses and Dissertations, 2015, 107 pages.

Park et al., "Single-sided continuous optoelectrowetting (SCOEW) for droplet manipulation with light patterns", Lab on a Chip, 2010, vol. 10, No. 13, pp. 1655-1661.

Valley et al., "A unified platform for optoelectrowetting and optoelectronic tweezers", Lab on a Chip, 2011, vol. 11, No. 7, pp. 1292-1297.

Deutscher et al., "Enzymatic Synthesis of Deoxyribonucleic Acid", The Journal of Biological Chemistry, 1969, vol. 244, No. 11, pp. 3019-3028, XP055447222.

Zhou et al., "Electrostatic charging and control of droplets in microfluidic devices", Lab on a Chip, 2013, vol. 13, No. 5, pp. 962-969.

Chiou et al., "Pico liter droplet manipulation based on a novel continous opto-electrowetting mechanism", 12th International Conference on Transducers, Solid State Sensors, Actuators and Microsystems, 2003, vol. 1, pp. 468-471.

Jing et al., "Jetting microfluidics with size-sorting capability for single-cell protease detection", Biosensors and Bioelectronics, 2014, vol. 66, pp. 19-23.

Ng et al., "Digital Microfluidic Cell Culture", Annual Review of Biomedical Engineering, 2015, vol. 17, No. 1, pp. 91-112.

Barbulovic-Nad et al., "A microfluidic platform for complete mammalian cell culture", Lab on a Chip, 2010, vol. 10, No. 12, pp. 1536-1542.

Eydelnant et al., "Virtual microwells for digital microfluidic reagent dispensing and cell culture", Lab on a Chip, 2012, vol. 12, pp. 750-757.

Park et al., "On-chip characterization of cryoprotective agent mixtures using an EWOD-based digital microfluidic device", Lab on a Chip, 2011, vol. 11, No. 13, pp. 2212-2221.

Huang et al., "Fertilization of Mouse Gametes in Vitro Using a Digital Microfluidic System", IEEE Transactions on Nanobioscience, 2015, vol. 14, No. 8, pp. 857-863.

Huang et al., Digital Microfluidic Dynamic Culture of Mammalian Embryos on an Electrowetting on Dielectric (EWOD) Chip, PLOS ONE, 2015, vol. 10, No. 5, 15 pages.

International Search Report dated Jul. 19, 2018 in International (PCT) Patent Application No. PCT/EP2018/066573.

Hwang et al., "Optoelectrofluidic platforms for chemistry and biology", The Roya Society of Chemistry, Lap on a Chip, 2011, vol. 11, No. 33, pp. 33-47, 15 pages.

* cited by examiner

MICRODROPLET MANIPULATION DEVICE

This invention relates to a device suitable for the manipulation of microdroplets for example in fast-processing chemical reactions and/or in chemical analyses carried out on multiple analytes simultaneously.

Devices for manipulating droplets or magnetic beads have been previously described in the art; see for example U.S. Pat. No. 6,565,727, US20130233425 and US20150027889. In the case of droplets this is typically achieved by causing the droplets, for example in the presence of an immiscible carrier fluid, to travel through a microfluidic channel defined by two opposed walls of a cartridge or microfluidic tubing. Embedded in the walls of the cartridge or tubing are electrodes covered with a dielectric layer each of which are connected to an A/C biasing circuit capably of being switched on and off rapidly at intervals to modify the electrowetting field characteristics of the layer. This gives rise to localised directional capillary forces that can be used to steer the droplet along a given path. However, the large amount of electrode switching circuitry required makes this approach somewhat impractical when trying to manipulate a large number of droplets simultaneously. In addition the time taken to effect switching tends to impose significant performance limitations on the device itself.

A variant of this approach, based on optically-mediated electrowetting, has been disclosed in for example US20030224528, US20150298125 and US20160158748. In particular, the first of these three patent applications discloses various microfluidic devices which include a microfluidic cavity defined by first and second walls and wherein the first wall is of composite design and comprised of substrate, photoconductive and insulating (dielectric) layers. Between the photoconductive and insulating layers is disposed an array of conductive cells which are electrically isolated from one another and coupled to the photoactive layer and whose functions are to generate corresponding discrete droplet-receiving locations on the insulating layer. At these locations, the surface tension properties of the droplets can be modified by means of an electrowetting field. The conductive cells may then be switched by light impinging on the photoconductive layer. This approach has the advantage that switching is made much easier and quicker although its utility is to some extent still limited by the arrangement of the electrodes. Furthermore, there is a limitation as to the speed at which droplets can be moved and the extent to which the actual droplet pathway can be varied.

A double-walled embodiment of this latter approach has been disclosed in University of California at Berkeley thesis UCB/EECS-2015-119 by Pei. Here, a cell is described which allows the manipulation of relatively large droplets in the size range 100-500 μm using optical electrowetting across a surface of Teflon AF deposited over a dielectric layer using a light-pattern over un-patterned electrically biased amorphous silicon. However in the devices exemplified the dielectric layer is thin (100 nm) and only disposed on the wall bearing the photoactive layer. This design is not well-suited to the fast manipulation of microdroplets.

We have now developed an improved version of this approach which enables many thousands of microdroplets, in the size range less than 10 μm, to be manipulated simultaneously and at velocities higher than have been observed hereto. It is one feature of this device that the insulating layer is in an optimum range. It is another that conductive cells are dispensed with and hence permanent droplet-receiving locations, are abandoned in favour a homogeneous dielectric surface on which the droplet-receiving locations are generated ephemerally by selective and varying illumination of points on the photoconductive layer using for example a pixellated light source. This enables highly localised electrowetting fields capable of moving the microdroplets on the surface by induced capillary-type forces to be established anywhere on the dielectric layer; optionally in association with any directional microfluidic flow of the carrier medium in which the microdroplets are dispersed; for example by emulsification. In one embodiment, we have further improved our design over that disclosed by Pei in that we have added a second optional layer of high-strength dielectric material to the second wall of the structure described below, and a very thin anti-fouling layer which negates the inevitable reduction in electrowetting field caused by overlaying a low-dielectric-constant anti-fouling layer. Thus, according to one aspect of the present invention, there is provided device for manipulating microdroplets using optically-mediated electrowetting characterised by consisting essentially of:

- a first composite wall comprised of:
  - a first transparent substrate
  - a first transparent conductor layer on the substrate having a thickness in the range 70 to 250 nm;
  - a photoactive layer activated by electromagnetic radiation in the wavelength range 400-1000 nm on the conductor layer having a thickness in the range 300-1000 nm and
  - a first dielectric layer on the conductor layer having a thickness in the range 120 to 160 nm;
- a second composite wall comprised of:
  - a second substrate;
  - a second conductor layer on the substrate having a thickness in the range 70 to 250 nm and
  - optionally a second dielectric layer on the conductor layer having a thickness in the range 25 to 50 nm wherein the exposed surfaces of the first and second dielectric layers are disposed less than 10 μm apart to define a microfluidic space adapted to contain microdroplets;
- an A/C source to provide a voltage across the first and second composite walls connecting the first and second conductor layers;
- at least one source of electromagnetic radiation having an energy higher than the bandgap of the photoexcitable layer adapted to impinge on the photoactive layer to induce corresponding ephemeral electrowetting locations on the surface of the first dielectric layer and
- means for manipulating the points of impingement of the electromagnetic radiation on the photoactive layer so as to vary the disposition of the ephemeral electrowetting locations thereby creating at least one electrowetting pathway along which the microdroplets may be caused to move.

DETAILED DESCRIPTION

Figure 1:
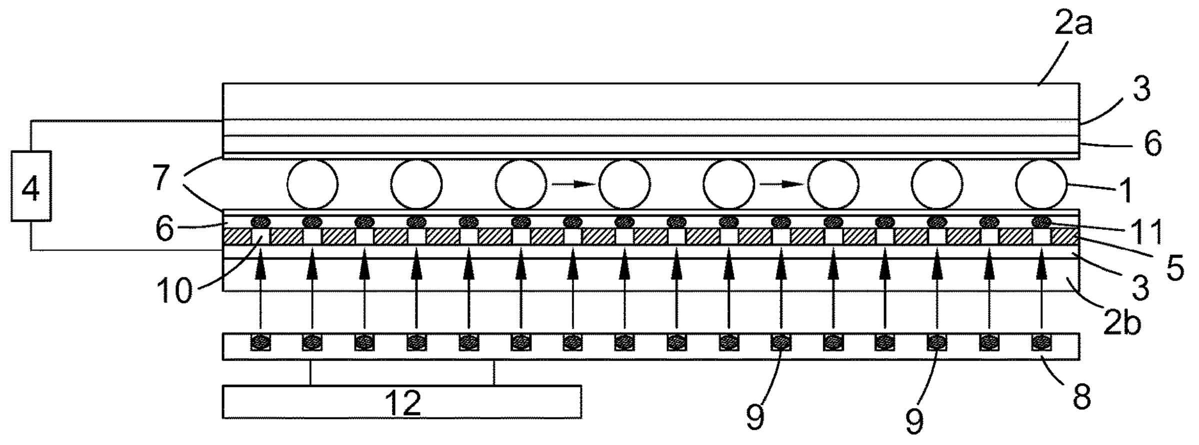
FIG. 1 shows a cross-sectional view of a device according to the invention suitable for the fast manipulation of aqueous microdroplets.

In one embodiment, the first and second walls of the device can form or are integral with the walls of a transparent chip or cartridge with the microfluidic space sandwiched between. In another, the first substrate and first conductor layer are transparent enabling light from the source of electromagnetic radiation (for example multiple laser beams or LED diodes) to impinge on the photoactive layer. In another, the second substrate, second conductor layer and second dielectric layer are transparent so that the same objective can be obtained. In yet another embodiment, all these layers are transparent.

Suitably, the first and second substrates are made of a material which is mechanically strong for example glass metal or an engineering plastic. In one embodiment, the substrates may have a degree of flexibility. In yet another embodiment, the first and second substrates have a thickness in the range 100-1000 μm.

The first and second conductor layers are located on one surface of the first and second substrates and are typically have a thickness in the range 70 to 250 nm, preferably 70 to 150 nm. In one embodiment, at least one of these layers is made of a transparent conductive material such as Indium Tin Oxide (ITO), a very thin film of conductive metal such as silver or a conducting polymer such as PEDOT or the like. These layers may be formed as a continuous sheet or a series of discrete structures such as wires. Alternatively the conductor layer may be a mesh of conductive material with the electromagnetic radiation being directed between the interstices of the mesh.

The photoactive layer is suitably comprised of a semiconductor material which can generate localised areas of charge in response to stimulation by the source of electromagnetic radiation. Examples include hydrogenated amorphous silicon layers having a thickness in the range 300 to 1000 nm. In one embodiment, the photoactive layer is activated by the use of visible light.

The photoactive layer in the case of the first wall and optionally the conducting layer in the case of the second wall are coated with a dielectric layer which is typically in the thickness range from 120 to 160 nm. The dielectric properties of this layer preferably include a high dielectric strength of >10^7 V/m and a dielectric constant of >3. Preferably, it is as thin as possible consistent with avoiding dielectric breakdown. In one embodiment, the dielectric layer is selected from high purity alumina or silica, hafnia or a thin non-conducting polymer film.

In another embodiment of the device, at least the first dielectric layer, preferably both, are coated with an anti-fouling layer to assist in the establishing the desired microdroplet/oil/surface contact angle at the various electrowetting locations, and additionally to prevent the contents of the droplets adhering to the surface and being diminished as the droplet is moved across the device. If the second wall does not comprise a second dielectric layer, then the second anti-fouling layer may applied directly onto the second conductor layer. For optimum performance, the anti-fouling layer should assist in establishing a microdroplet/carrier/surface contact angle that should be in the range 50-70° when measured as an air-liquid-surface three-point interface at 25° C. Dependent on the choice of carrier phase the same contact angle of droplets in a device filled with an aqueous emulsion will be higher, greater than 100°. In one embodiment, these layer(s) have a thickness of less than 50 nm and are typically a monomolecular layer. In another these layers are comprised of a polymer of an acrylate ester such as methyl methacrylate or a derivative thereof substituted with hydrophilic groups; e.g. alkoxysilyl. Preferably either or both of the anti-fouling layers are hydrophobic to ensure optimum performance.

The first and second dielectric layers and therefore the first and second walls define a microfluidic space which is less than 10 μm in width and in which the microdroplets are contained. Preferably, before they are contained in this microdroplet space, the microdroplets themselves have an intrinsic diameter which is more than 10% greater, suitably more than 20% greater, than the width of the microdroplet space. This may be achieved, for example, by providing the device with an upstream inlet, such as a microfluidic orifice, where microdroplets having the desired diameter are generated in the carrier medium. By this means, on entering the device the microdroplets are caused to undergo compression leading to enhanced electrowetting performance through greater contact with the first dielectric layer.

In another embodiment, the microfluidic space includes one or more spacers for holding the first and second walls apart by a predetermined amount. Options for spacers includes beads or pillars, ridges created from an intermediate resist layer which has been produced by photo-patterning. Various spacer geometries can be used to form narrow channels, tapered channels or partially enclosed channels which are defined by lines of pillars. By careful design, it is possible to use these structures to aid in the deformation of the microdroplets, subsequently perform droplet splitting and effect operations on the deformed droplets.

The first and second walls are biased using a source of A/C power attached to the conductor layers to provide a voltage potential difference therebetween; suitably in the range 10 to 50 volts.

The device of the invention further includes a source of electromagnetic radiation having a wavelength in the range 400-1000 nm and an energy higher than the bandgap of the photoexcitable layer. Suitably, the photoactive layer will be activated at the electrowetting locations where the incident intensity of the radiation employed is in the range 0.01 to 0.2 $Wcm^{-2}$. The source of electromagnetic radiation is, in one embodiment, highly attenuated and in another pixellated so as to produce corresponding photoexcited regions on the photoactive layer which are also pixellated. By this means corresponding electrowetting locations on the first dielectric layer which are also pixellated are induced. In contrast to the design taught in US20030224528, these points of pixellated electrowetting are not associated with any corresponding permanent structure in the first wall as the conductive cells are absent. As a consequence, in the device of the present invention and absent any illumination, all points on the surface of first dielectric layer have an equal propensity to become electrowetting locations. This makes the device very flexible and the electrowetting pathways highly programmable. To distinguish this characteristic from the types of permanent structure taught in the prior art we have chosen to characterise the electrowetting locations generated in our device as 'ephemeral' and the claims of our application should be construed accordingly.

The optimised structure design taught here is particularly advantageous in that the resulting composite stack has the anti-fouling and contact-angle modifying properties from the coated monolayer (or very thin functionalised layer) combined with the performance of a thicker intermediate layer having high-dielectric strength and high-dielectric constant (such as aluminium oxide or Hafnia). The resulting layered structure is highly suitable for the manipulation of very small volume droplets, such as those having diameter less than 10 μm, for example in the range 2 to 8, 2 to 6 or 2 to 4 μm. For these extremely small droplets, the performance advantage of a having the total non-conducting stack above the photoactive layer is extremely advantageous, as the droplet dimensions start to approach the thickness of the dielectric stack and hence the field gradient across the droplet (a requirement for electrowetting-induced motion) is reduced for the thicker dielectric.

Where the source of electromagnetic radiation is pixellated it is suitably supplied either directly or indirectly using a reflective screen illuminated by light from LEDs. This enables highly complex patterns of ephemeral electrowetting locations to be rapidly created and destroyed in the first dielectric layer thereby enabling the microdroplets to be precisely steered along arbitrary ephemeral pathways using closely-controlled electrowetting forces. This is especially advantageous when the aim is to manipulate many thousands of such microdroplets simultaneously along multiple electrowetting pathways. Such electrowetting pathways can be viewed as being constructed from a continuum of virtual electrowetting locations on the first dielectric layer.

The points of impingement of the sources of electromagnetic radiation on the photoactive layer can be any convenient shape including the conventional circular. In one embodiment, the morphologies of these points are determined by the morphologies of the corresponding pixelations and in another correspond wholly or partially to the morphologies of the microdroplets once they have entered the microfluidic space. In one preferred embodiment, the points of impingement and hence the electrowetting locations may be crescent-shaped and orientated in the intended direction of travel of the microdroplet. Suitably the electrowetting locations themselves are smaller than the microdroplet surface adhering to the first wall and give a maximal field intensity gradient across the contact line formed between the droplet and the surface dielectric.

In one embodiment of the device, the second wall also includes a photoactive layer which enables ephemeral electrowetting locations to also be induced on the second dielectric layer by means of the same or different source of electromagnetic radiation. The addition of a second dielectric layer enables transition of the wetting edge from the upper to the lower surface of the electrowetting device, and the application of more electrowetting force to each microdroplet.

The device of the invention may further include a means to analyse the contents of the microdroplets disposed either within the device itself or at a point downstream thereof. In one embodiment, this analysis means may comprise a second source of electromagnetic radiation arranged to impinge on the microdroplets and a photodetector for detecting fluorescence emitted by chemical components contained within. In another embodiment, the device may include an upstream zone in which a medium comprised of an emulsion of aqueous microdroplets in an immiscible carrier fluid is generated and thereafter introduced into the microfluidic space on the upstream side of the device. In one embodiment, the device may comprise a flat chip having a body formed from composite sheets corresponding to the first and second walls which define the microfluidic space therebetween and at least one inlet and outlet.

In one embodiment, the means for manipulating the points of impingement of the electromagnetic radiation on the photoactive layer is adapted or programmed to produce a plurality of concomitantly-running, for example parallel, first electrowetting pathways on the first and optionally the second dielectric layers. In another embodiment, it is adapted or programmed to further produce a plurality of second electrowetting pathways on the first and/or optionally the second dielectric layers which intercept with the first electrowetting pathways to create at least one microdroplet-coalescing location where different microdroplets travelling along different pathways can be caused to coalesce. The first and second electrowetting pathway may intersect at right-angles to each other or at any angle thereto including head-on.

Devices of the type specified above may be used to manipulate microdroplets according to a new method. Accordingly, there is also provided a method for manipulating aqueous microdroplets characterised by the steps of (a) introducing an emulsion of the microdroplets in an immiscible carrier medium into a microfluidic space having a defined by two opposed walls spaced 10 μm or less apart and respectively comprising:

- a first composite wall comprised of:
  - a first transparent substrate
  - a first transparent conductor layer on the substrate having a thickness in the range 70 to 250 nm;
  - a photoactive layer activated by electromagnetic radiation in the wavelength range 400-1000 nm on the conductor layer having a thickness in the range 300-1000 nm and
  - a first dielectric layer on the conductor layer having a thickness in the range 120 to 160 nm;
- a second composite wall comprised of:
  - a second substrate;
  - a second conductor layer on the substrate having a thickness in the range 70 to 250 nm and
  - optionally a second dielectric layer on the conductor layer having a thickness in the range 120 to 160 nm;

(b) applying a plurality of point sources of the electromagnetic radiation to the photoactive layer to induce a plurality of corresponding ephemeral electrowetting locations in the first dielectric layer and (c) moving a least one of the microdroplets in the emulsion along an electrowetting pathway created by the ephemeral electrowetting locations by varying the application of the point sources to the photoactive layer.

Suitably, the emulsion employed in the method defined above is an emulsion of aqueous microdroplets in an immiscible carrier solvent medium comprised of a hydrocarbon, fluorocarbon or silicone oil and a surfactant. Suitably, the surfactant is chosen so as ensure that the microdroplet/carrier medium/electrowetting location contact angle is in the range 50 to 70° when measured as described above. In one embodiment, the carrier medium has a low kinematic viscosity for example less than 10 centistokes at 25° C. In another, the microdroplets disposed within the microfluidic space are in a compressed state.

The invention is now illustrated by the following.

FIG. 1 shows a cross-sectional view of a device according to the invention suitable for the fast manipulation of aqueous microdroplets 1 emulsified into a hydrocarbon oil having a viscosity of 5 centistokes or less at 25° C. and which in their unconfined state have a diameter of less than 10 μm (e.g. in the range 4 to 8 μm). It comprises top and bottom glass plates (2*a* and 2*b*) each 500 μm thick coated with transparent layers of conductive Indium Tin Oxide (ITO) 3 having a thickness of 130 nm. Each of 3 is connected to an A/C source 4 with the ITO layer on 2*b* being the ground. 2*b* is coated with a layer of amorphous silicon 5 which is 800 nm thick. 2*a* and 5 are each coated with a 160 nm thick layer of high purity alumina or Hafnia 6 which are in turn coated with a monolayer of poly(3-(trimethoxysilyl)propyl methacrylate) 7 to render the surfaces of 6 hydrophobic. 2*a* and 5 are spaced 8 μm apart using spacers (not shown) so that the microdroplets undergo a degree of compression when introduced into the device. An image of a reflective pixelated screen, illuminated by an LED light source 8 is disposed generally beneath 2*b* and visible light (wavelength 660 or 830 nm) at a level of 0.01 $Wcm^2$ is emitted from each diode 9 and caused to impinge on 5 by propagation in the direction of the multiple upward arrows through 2*b* and 3. At the various points of impingement, photoexcited regions of charge 10 are created in 5 which induce modified liquid-solid contact angles in 6 at corresponding electrowetting locations 11. These modified properties provide the capillary force necessary to propel the microdroplets 1 from one point 11 to another. 8 is controlled by a microprocessor 12 which determines which of 9 in the array are illuminated at any given time by pre-programmed algorithms.

Figure 2:
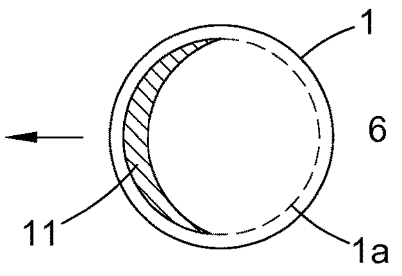
FIG. 2 shows a top-down plan of a microdroplet within a region the device.

FIG. 2 shows a top-down plan of a microdroplet 1 located on a region of 6 on the bottom surface bearing a microdroplet 1 with the dotted outline 1*a* delimiting the extent of touching. In this example, 11 is crescent-shaped in the direction of travel of 1.

The invention claimed is:

1. A device for manipulating many thousands microdroplets simultaneously using optically-mediated electrowetting comprising:

a first composite wall comprising:

a first substrate;

a first transparent conductor layer on the first substrate having a thickness in the range 70 to 250 nm;

a photoactive layer activated by electromagnetic radiation in the wavelength range 400-1000 nm on the first transparent conductor layer having a thickness in the range 300-1000 nm and a first dielectric layer on the photoactive layer; and a first anti-fouling layer on the first dielectric layer-;

a second composite wall comprising:

a second substrate;

a second conductor layer on the second substrate having a thickness in the range 70 to 250 nm; and a second dielectric layer on the second conductor layer; and a second anti-fouling layer on the second dielectric layer the device further comprising:

one or more spacers for holding the first and second walls apart by a determined amount to define a microfluidic space adapted to contain microdroplets, wherein the spacer comprises a bead, a pillar or a ridge;

an A/C source to provide a voltage of between 10V and 50V across the first and second composite walls connecting the first and second conductor layers so as to be below the dielectric breakdown voltage of the first and second dielectric layers;

at least one source of electromagnetic radiation having an energy higher than the bandgap of a photoexcitable layer adapted to impinge on the photoactive layer to induce corresponding ephemeral electrowetting locations on the surface of the first dielectric layer; and a microprocessor for manipulating points of impingement of the electromagnetic radiation on the photoactive layer so as to vary the disposition of the ephemeral electrowetting locations thereby creating at least one electrowetting pathway along which microdroplets may be caused to move;

wherein the device is configured to performing chemical analyses carried out on multiple analytes simultaneously; and the device further comprising an upstream zone in which a medium comprised of an emulsion of aqueous microdroplets in an immiscible carrier fluid is generated and thereafter introduced into the microfluidic space on the upstream side of the device.

2. The device according to claim 1, further comprising an upstream inlet to induce a flow of the medium comprised of the emulsion of aqueous microdroplets in the immiscible carrier fluid through the microfluidic space.

3. The device according to claim 1, wherein the upstream inlet is provided for introducing into the microfluidic space microdroplets whose diameters are more than 20% greater than the width of the microfluidic space.

4. The device according to claim 2, wherein the upstream inlet is a microfluidic orifice.

5. The device according to claim 1, further comprising a source of electromagnetic radiation to stimulate fluorescence in the microdroplets and a photodetector to detect fluorescence in the microdroplets located within or downstream of the device.

6. The device according to claim 1, wherein the device is a flat chip having a body formed from composite sheets corresponding to the first and second walls, which define the microfluidic space therebetween and at least one inlet and outlet.

7. The device according to claim 1, wherein the first and second composite wall are first and second composite sheets which define the microfluidic space therebetween and form the periphery of a cartridge or chip.

8. The device according to claim 3, wherein the upstream inlet is a microfluidic orifice.

* * * * *